United States Patent Office 3,422,079
Patented Jan. 14, 1969

3,422,079
COORDINATION COMPLEXES OF VINYLPHOSPHINE OXIDES AND METAL SALTS, AND POLYMERS THEREOF
Frank J. Welch, Charleston, and Herbert J. Paxton, Jr., Elkview, W. Va., assignors to Union Carbide Corporation, a corporation of New York
No Drawing. Filed Oct. 30, 1963, Ser. No. 319,992
U.S. Cl. 260—80    23 Claims
Int. Cl. C07f *9/50;* C07f *9/40;* C08f *3/84*

This invention relates to stable coordination complexes of vinylphosphine oxides and metal salts, and to polymers of these complexes.

The stable coordination complexes of the instant invention are produced by reacting a suitable metal salt with a suitable vinylphosphine oxide. These complexes can be represented by the formula:

$$MA_m \cdot X[R_2\overset{O}{\underset{\|}{P}}CH{=}CH_2]$$

wherein M is a metal selected from the group consisting of the metals present in Groups I–B, II–B, III–A, III–B, IV–A, IV–B, V–A, V–B, VI–B, VII–B, and VIII of the Periodic Table, and those metals of Group II–A of the Periodic Table having an atomic weight below 25; A is an acetate or a monovalent inorganic anion; R is a monovalent hydrocarbon radical, including aliphatic, alicyclic and aromatic, and substituted aliphatic, alicyclic and aromatic, said radical having from 1 to 20 carbon atoms, preferably from 1 to 10 carbon atoms; $m$ is an integer having a value equal to the valence of metal M; and X is an integer having a value equal to the coordination number of metal salt $MA_m$, usually 1 or 2. The Periodic Table referred to throughout this specification is the one appearing on pp. 58–59 of Lange's Handbook of Chemistry, Seventh Edition, 1949. Illustrative of M in the above formula are metals such as copper, magnesium, zinc, mercury, aluminum, tin, titanium, antimony, iron, nickel, cobalt, chromium, molybdenum, manganese, vanadium, palladium, uranium, plutonium, gold, zirconium, platinum, beryllium, and the like. Among the anions which are represented by A in the above formula are acetate, chloride, bromide, fluoride, iodide, nitrate, perchlorate, and the like. Representative of R in the above formula are radicals such as methyl, ethyl, vinyl, allyl, n-propyl, isopropyl, n-butyl, isobutyl, n-pentyl, n-hexyl, cyclohexyl, cyclohexenyl, 4-methylpentyl, n-heptyl, n-octyl, 2-ethylhexyl, n-nonyl, n-decyl, 2,2-dimethyldecyl, n-tridecyl, n-tetradecyl, n-pentadecyl, n-octadecyl, n-eicosyl, phenyl, tolyl, xylyl, naphthyl, and the like.

The coordination complexes of the instant invention can be incorporated into various polymers, such as polyethylene, polypropylene, polystyrene, poly(methyl acrylate), poly(methyl methacrylate), poly(ethyl acrylate), polyacrylonitrile, poly(methacrylamide), and the like, by milling on a two-roll mill at temperatures of from about 30° C. to about 250° C. to impart to the polymer improved combustion resistance. Such blends suitably contain from about 1 part by weight to about 30 parts by weight of the complex based on the total weight of the mixture.

The metal salts which can be employed in preparing the novel coordination complexes of the instant invention can be depicted by the formula:

$$MA_m$$

wherein M, A, and $m$ are as above defined. Illustrative of such metal salts are compounds such as copper acetate, copper chloride, copper bromide, copper fluoride, copper iodide, copper nitrate, copper perchlorate, magnesium acetate, magnesium chloride, magnesium bromide, magnesium fluoride, magnesium iodide, magnesium nitrate, magnesium perchlorate, zinc acetate, zinc chloride, zinc bromide, zinc fluoride, zinc iodide, zinc nitrate, zinc perchlorate, mercury acetate, mercury chloride, mercury bromide, mercury fluoride, mercury iodide, mercury nitrate, mercury perchlorate, aluminum acetate, aluminum chloride, aluminum bromide, aluminum fluoride, aluminum iodide, aluminum nitrate, aluminum perchlorate, tin acetate, tin chloride, tin bromide, tin fluoride, tin iodide, tin nitrate, tin perchlorate, titanium acetate, titanium chloride, titanium bromide, titanium fluoride, titanium iodide, titanium nitrate, titanium perchlorate, antimony acetate, antimony chloride, antimony bromide, antimony fluoride, antimony iodide, antimony nitrate, antimony perchlorate, iron acetate, iron chloride, iron bromide, iron fluoride, iron iodide, iron nitrate, iron perchlorate, nickel acetate, nickel chloride, nickel bromide, nickel fluoride, nickel iodide, nickel nitrate, nickel perchlorate, cobalt acetate, cobalt chloride, cobalt bromide, cobalt fluoride, cobalt iodide, cobalt nitrate, cobalt perchlorate, chromium acetate, chromium chloride, chromium bromide, chromium fluoride, chromium iodide, chromium nitrate, chromium perchlorate, molybdenum acetate, molybdenum chloride, molybdenum bromide, molybdenum fluoride, molybdenum iodide, molybdenum nitrate, molybdenum perchlorate, manganese acetate, manganese chloride, manganese bromide, manganese fluoride, manganese iodide, manganese nitrate, manganese perchlorate, vanadium acetate, vanadium chloride, vanadium bromide, vanadium fluoride, vanadium iodide, vanadium nitrate, vanadium perchlorate, palladium acetate, palladium chloride, palladium bromide, palladium fluoride, palladium iodide, palladium nitrate, palladium perchlorate, uranium acetate, uranium chloride, uranium bromide, uranium fluoride, uranium iodide, uranium nitrate, uranium perchlorate, plutonium acetate, plutonium chloride, plutonium bromide, plutonium fluoride, plutonium iodide, plutonium nitrate, plutonium perchlorate, gold acetate, gold chloride, gold bromide, gold fluoride, gold iodide, gold nitrate, gold perchlorate, zirconium acetate, zirconium chloride, zirconium bromide, zirconium fluoride, zirconium iodide, zirconium nitrate, zirconium perchlorate, platinum acetate, platinum chloride, platinum bromide, platinum fluoride, platinum iodide, platinum nitrate, platinum perchlorate, beryllium acetate, beryllium chloride, beryllium bromide, beryllium fluoride, beryllium iodide, beryllium nitrate, beryllium perchlorate, and the like.

The vinylphosphine oxides which can be employed in preparing the novel coordination complexes of the instant invention can be represented by the formula:

$$R_2\overset{O}{\underset{\|}{P}}CH{=}CH_2$$

wherein R is as above defined. Illustrative of such vinylphosphine oxides are compounds such as vinyldimethylphosphine oxide, vinyldiethylphosphine oxide, vinylmethylethylphosphine oxide, trivinylphosphine oxide, vinyldiallylphosphine oxide, vinyldi-n-propylphosphine oxide, vinyldiisopropylphosphine oxide, vinyldi-n-butylphosphine oxide, vinyldiisobutylphosphine oxide, vinyldi-n-pentylphosphine oxide, vinyldi-n-hexylphosphine oxide, vinyldicyclohexylphosphine oxide, vinyldicyclohexenylphosphine oxide, vinyldi-4-methylpentylphosphine oxide, vinyldi-n-heptylphosphine oxide, vinyldi-n-octylphosphine oxide, vinyldi-2-ethylhexylphosphine oxide, vinyldi-n-nonylphosphine oxide, vinyldi-n-decylphosphine oxide, vinyldi-2,2-dimethyldecylphosphine oxide, vinyldi-n-tridecylphosphine oxide, vinyldi-n-tetradecylphosphine oxide, vinyldi-n-pentadecylphosphine oxide, vinyldi-n-octadecylphosphine oxide, vinyldi-n-eicosylphosphine oxide, vinyldi-phenylphosphine oxide, phenyldivinylphosphine oxide, vinylditolyphosphine oxide, vinyldixylylphosphine oxide, vinyldinapthylphosphine oxide, and the like.

Reaction between a metal salt and a vinylphosphine oxide according to the instant invention can be effected by heating an admixture of these materials above their melting points and above the melting point of the resulting complex. If desired reaction can be effected in an inert liquid organic solvent at temperatures ranging from as low as about −50° C. to as high as about 250° C., preferably from about 0° C. to about 100° C.

The solvent employed can be a solvent for both the metal salt and the vinylphosphine oxide, or for one of these reactants and the complex formed by the reaction. Suitable solvents which can be employed include alcohols such as ethanol, butanol, isopropanol, and the like, ethers such as ethyl ether, tetrahydrofuran, and the like, amides such as dimethylformamide, and the like, esters such as ethyl acetate, and the like, nitriles such as acetonitrile, and the like, aromatic hydrocarbons such as benzene, toluene, and the like, and alkyl halides such as ethylene dichloride, and the like. In general, an amount of solvent ranging from about 1 to about 100 times, preferably from about 4 to about 10 times, the weight of the reactants can be effectively employed.

Preferably, the metal salt and the vinylphosphine oxide are employed in a molar ratio of vinylphosphine oxide to metal salt of about 2:1. However, greater or lesser amounts of either reactant, for example, amounts of vinylphosphine oxide ranging from as little as 0.5 mole to as much as 4 moles, per mole of metal salt present, can also be employed.

Atmospheric pressure is usually employed in effecting reaction according to the process of the instant invention. However, pressures both above and below atmospheric pressure, for example pressures ranging from as low as 1 mm. Hg to as high as 10 atmospheres, can also be employed, whenever it is desirable to do so.

Because of the vinyl group present, most of the vinylphosphine oxide-metal salt complexes of the instant invention can be readily homopolymerized, or interpolymerized with one or more polymerizable organic compounds, such as ethylene, styrene, butadiene, methyl acrylate, methyl methacrylate, ethyl acrylate, vinyl acetate, vinyl chloride, vinylidene chloride, acrylonitrile, methacrylonitrile, vinylidene cyanide, acrylamide, methacrylamide, maleic anhydride, N-vinylacetamide, vinyl methyl ether, and the like. Polymers produced from complexes containing no unsaturated polymerizable group other than the vinyl group are fusible, thermally stable, flame and solvent resistant thermoplastic polymers. Such polymers are useful in molding and extrusion applications, such as in the preparation of films, fibers, and various molded objects, and can be used to provide a protective coating to various materials. Polymers produced from complexes containing an unsaturated polymerizable group in addition to the vinyl group are thermally stable, flame and solvent resistant thermosetting polymers useful as casting resins. However, complexes prepared from metal salts of metals of Groups I–B and VIII of the Periodic Table act as polymerization inhibitors, so that polymers have only been successfully prepared from complexes of metal salts of metals of Groups II–A through VII–B of the Periodic Table.

The interpolymers obtained by interpolymerizing the coordination complexes of the instant invention can contain from as low as 0.1 mole percent to as high as 10 mole percent, usually from 1 mole percent to 8 mole percent, of the combined complex.

Polymerization of the vinlyphosphine oxide-metal salt complexes of the instant invention can be effected by means of a suitable vinyl polymerization catalyst, such as an anionic catalyst or a catalyst capable of forming free radicals under the polymerization conditions employed. Generally, temperatures of from about −25° C. to about 200° C. as suitable. Known solvents can be employed in the polymerization mixture if desired. Typical of the anionic catalysts which can be employed are Grignard reagents and other metal alkyls such as n-butylmagnesium chloride, methylmagnesium bromide, phenylmagnesium bromide, di-n-butylmagnesium, ethyllithium, phenyllithium, triethylaluminum, and the like. Among the free radical catalysts which can be employed are oxygen, either alone or together with a trialkyboron, such as trimethylyboron, triethylboron and tripropylboron; peroxides such as hydrogen peroxide, diethyl peroxide, dibenzoyl peroxide, distearyl peroxide, di-tertiary-butyl peroxide, tertiary-butyl hydroperoxide, diacetyl peroxide, distearoyl peroxide and acetyl benzoyl peroxide; azo compounds such as 2,2′-dicyanoazobenzene and 2,2′-azo-bis (2-methylpropionitrile); percarbonates such as diisopropyl percarbonate and di-tertiary-butyl percarbonate; and peresters such as tertiary-butyl perbenzoate and acetaldehyde monoperacetate. These catalysts are employed in amounts which are conventionally employed in the art, either individually or in various mixtures thereof. Thus such catalysts can be employed in an amount of from about 0.1 percent by weight to about 10 per cent by weigth, preferably from about 0.2 percent by weight to about 2 percent by weight, of the total amount of monomer present.

The following examples are set forth for purposes of illustration so that those skilled in the art may better understand this invention, and it should be understood that they are not to be construed as limiting this invention in any manner.

The term "reduced viscosity" ($I_R$), employed in the examples and throughout this specification, is a measure of the molecular weight of a polymer, and may be defined by the equation:

$$I_R = \frac{\frac{\Delta N}{N_0}}{C}$$

wherein $\Delta N$ is the difference in seconds between the flow-time of a solution of polymer through a capillary viscometer and the flow-time of the solvent, $N_0$ represents the flow-time of the solvent, and C is the concentration of polymer in said solution in grams per 100 milliliters of solvent. The value of $\Delta N/N_0$ is known as the specific viscosity. Reduced viscosity values in the examples and throughout the specification have reference to measurements made at 30° C. using a solution of 0.2 gram of polymer per 100 milliliters of solvent.

Example 1

A solution of 4.3 grams (22.3 moles) of vinyldi-n-butylphosphine oxide in 10 milliliters of ethanol was added to a solution of 1.4 grams (10.0 moles) of zinc chloride ($ZnCl_2$) in 25 milliliters of ethanol. The resulting solution was heated on a steam bath until the ethanol was evaporated. Fifty (50) milliliters of benzene were then added and distilled off to azeotropically remove any water or alcohol present. Heptane was then added and an immiscible layer separated which was removed and dried under vacuum. Four (4) grams of a light yellow, slightly viscous liquid 1:2 coordination complex of zinc chloride and vinyldi-n-butylphosphine oxide were recovered by this procedure. The product was characterized by an infrared spectrum of the phosphoryl band of 8.5μ as compared to 8.95μ in vinyldi-n-butylphosphine oxide.

*Analysis.*—Calculated for $C_{20}H_{42}P_2O_2Cl_2Zn$: C, 47.0%; H, 8.2%. Found: C, 47.6%; H, 7.6%.

Example 2

A solution of 3.3 grams (0.025 mole) of zinc chloride ($ZnCl_2$) in 40 milliliters of ethanol was added to a refluxing solution of 11.4 grams (0.05 mole) of vinyldiphenylphosphine oxide in 20 milliliters of ethanol. The resulting solution was heated on a steam bath until the ethanol was evaporated. Fifty (50) milliliters of benzene were then added and distilled off to azeotropically remove any water or alcohol present. On cooling, the residue crystallized to a white solid melting at 128–131° C. This product was recrystallized in 100 milliliters of isopropanol, and 14 grams of 1:2 coordination complex of zinc chloride and vinyldiphenylphosphine oxide were recovered. The complex had a melting point of 132° C., began to darken slightly at 280° C., and decomposed rapidly at 330° C. On immersion in water the complex hydrolyzed into its components. The complex was characterized by an infrared spectrum of the phosphoryl band of 8.72µ as compared to 8.45µ in vinyldiphenylphosphine oxide.

*Analysis.*—Calculated for $C_{28}H_{26}P_2O_2Cl_2Zn$: C, 56.8%; H, 4.5%; P, 10.4%; Cl, 11.9%. Found: C, 57.0%; H, 4.5%; P, 10.6%; Cl, 11.8%.

Example 3

A refluxing solution of 9.6 grams (0.042 mole) of vinyldiphenylphosphine oxide in 30 milliliters of ethanol was mixed with a refluxing solution of 6.0 grams (0.02 mole) of hexa-hydrated zinc nitrate $[Zn(NO_3)_2 \cdot 6H_2O]$ in 40 milliliters of ethanol. The resulting solution was heated on a steam bath until the ethanol was evaporated. The liquid residue was then extracted with 100 milliliters of hot toluene. On drying in a vacuum desiccator, 14 grams of 1:2 coordination complex of zinc nitrate and vinyldiphenylphosphine oxide crystallized from the toluene. The complex had a melting point of 95–99° C., and began to decompose at 150° C. The complex was characterized by an infrared spectrum of the phosphoryl band of 8.76µ.

*Analysis.*—Calculated for $C_{28}H_{26}P_2O_8N_2Zn$: C, 52.1%; H, 4.1%; P, 9.6%. Found: C, 52.6%; H, 4.1%; P, 9.3%.

Example 4

Ten and one-half (10.5) grams (0.05 mole) of zinc acetate $[Zn(OOCCH_3)_2]$ were added to a solution of 23 grams (0.10 mole) of vinyldiphenylphosphine oxide in 250 milliliters of toluene. The resulting mixture was refluxed for one hour, during which time the zinc acetate gradually dissolved. At the end of this time, the hot solution was filtered, and then concentrated to 200 milliliters by heating on a hot plate. Upon cooling the solution to 10° C. overnight, a crystalline product separated. The crystals were filtered, washed with heptane, and dried in a vacuum desiccator. Twenty (20) grams of a 1:2 coordination complex of zinc acetate and vinyldiphenylphosphine oxide were recovered by this procedure. The complex had a melting point of 109–111° C., and was characterized by an infrared spectrum of the phosphoryl band of 8.52µ.

*Analysis.*—Calculated for $C_{32}H_{60}P_2O_6Zn$: C, 60.4%; H, 5.1%. Found: C, 61.5%; H, 5.2%.

When the 1:2 complex was heated above its melting point, a liquid and a solid phase separated. The solid was zinc acetate and the liquid was a 1:3 coordination complex of zinc acetate and vinyldiphenylphosphine oxide. The 1:3 complex had a melting point of 104–112° C.

*Analysis.*—Calculated for $C_{46}H_{45}P_3O_5Zn$: C, 63.6%; H, 5.2%. Found: C, 63.6%; H, 5.2%.

When the liquid and solid phases obtained by heating the 1:2 complex above its melting point were further heated to 200° C., a homogeneous solution resulted.

Example 5

A mixture of 114 grams (0.50 mole) of vinyldiphenylphosphine oxide, 200 milliliters of ethanol, and 48 grams (0.24 mole) of hexa-hydrated magnesium chloride $(MgCl_2 \cdot 6H_2O)$ was prepared and heated to reflux to produce a homogeneous solution. The alcohol was evaporated under reduced pressure, and the remaining viscous liquid residue was extracted with 100 milliliters of refluxing toluene. A solid 1:2 coordination complex of magnesium chloride and vinyldiphenylphosphine oxide separated from the toluene which was then decanted. The complex weighed 115 grams after drying in a vacuum desiccator. The complex had a melting point of 102–104° C., began to decompose at 275° C., and was characterized by an infrared spectrum of the phosphoryl band of 8.30µ. On immersion in water the complex hydrolyzed into its components.

*Analysis.*—Calculated for $C_{28}H_{26}P_2O_2Cl_2Mg$: C, 61.0%; H, 4.7%; P, 11.1%; Cl, 12.8%. Found: C, 60.1%; H, 4.6%; P, 10.1%; Cl, 13.0%.

Example 6

A mixture of 23 grams (0.10 mole) of vinyldiphenylphosphine oxide, 27 grams (0.10 mole) of mercuric chloride $(HgCl_2)$, and 200 milliliters of toluene was prepared and heated at reflux for two hours until solution was effected. The hot solution which resulted was filtered, 20 milliliters of heptane were added, and the resulting mixture was permitted to cool to 25° C. After standing for 20 hours, a solid 1:1 coordination complex of mercuric chloride and vinyldiphenylphosphine oxide crystallized from the mixture. The complex was washed with 300 milliliters of heptane and dried in a vacuum desiccator. The complex was soluble in n-butyl chloride, acetone, ethyl acetate and tetrahydrofuran, and was characterized by an infrared spectrum of the phosphoryl band of 8.67µ. Melting of the complex occurred at 104–106° C., and decomposition took place at 150° C.

*Analysis.*—Calculated for $C_{28}H_{26}P_2O_2Cl_2Hg$: C, 33.6%; H, 2.6%; P, 6.0%; Cl, 14.0%. Found: C, 33.5%; H, 2.7%; P, 5.9%; Cl, 14.4%.

Example 7

A solution of 9.6 grams (0.042 mole) of vinyldiphenylphosphine oxide in 30 milliliters of ethanol was mixed with a solution of 2.7 grams (0.020 mole) of aluminum chloride $(AlCl_3)$ in 30 milliliters of ethanol. The alcohol was evaporated from the clear solution under reduced pressure, leaving a soft glassy product which was dissolved in 100 milliliters of refluxing benzene. Upon cooling, a benzene-immiscible layer separated which was removed. The product was a soft, sticky, white, glassy solid which crystallized after six days of drying in a vacuum desiccator to a white, non-tacky solid 1:2 coordination complex of aluminum chloride and vinyldiphenylphosphine oxide. The complex decomposed at 215° C. and was characterized by an infrared spectrum of the phosphoryl band of 8.62µ. The complex was very hydroscopic and rapidly became tacky on exposure to air.

Example 8

A mixture of 9.6 grams (0.042 mole) of vinyldiphenylphosphine oxide, 4.6 grams (0.02 mole) of antimony trichloride $(SbCl_3)$, and 25 milliliters of toluene was prepared and heated at reflux until solution was effected. Upon cooling, a toluene-immiscible liquid layer separated which was removed. After standing for one week at room temperature, 14 grams of a solid 1:2 coordination complex of antimony trichloride and vinyldiphenylphosphine oxide crystallized. The complex had a melting point of 75–80° C., began to decompose at 245° C., and was characterized by an infrared spectrum of the phosphoryl band of 8.75µ.

*Analysis.*—Calculated for $C_{28}H_{26}P_2O_2Cl_3Sb$: C, 49.2%; H, 3.8%; Cl, 15.5%. Found: C, 48.8%; H, 3.7%; Cl, 15.3%.

Example 9

To a refluxing solution of 9.6 grams (0.042 mole) of vinyldiphenylphosphine oxide in 25 milliliters of toluene, were added, in a dropwise manner, 5.2 grams (0.020 mole) of stannic chloride $(SnCl_4)$. On continued heating, 13 grams of a 1:2 coordination complex of stannic chloride and vinyldiphenylphosphine oxide crystallized. The complex was recovered by filtration and dried in a vacuum desiccator. The dried complex had a melting point of 195–200° C., began to decompose at 250° C., and was characterized by an infrared spectrum of the phosphoryl band of 8.75µ.

*Analysis.*—Calculated for $C_{28}H_{26}P_2O_2Cl_4Sn$: H, 3.6%; Cl, 19.8%. Found: H, 3.8%; Cl, 19.8%.

Example 10

To a refluxing solution of 9.6 grams (0.042 mole) of vinyldiphenylphosphine oxide in 55 milliliters of toluene were added, in a dropwise manner, 3.8 grams (0.020 mole) of titanium tetrachloride ($TiCl_4$). On continued heating, a 1:2 coordination complex of titanium tetrachloride and vinyldiphenylphosphine oxide crystallized. The complex was recovered by filtration and dried in a vacuum desiccator. The dried complex had a melting point of 150–155° C., began to decompose at 200° C., and was characterized by an infrared spectrum of the phosphoryl band of $8.90\mu$.

*Analysis.*—Calculated for $C_{28}H_{26}P_2O_2Cl_4Ti$: C, 52.3%; H, 4.0%; Cl, 22.0%. Found: C, 52.0%; H, 4.1%; Cl, 21.2%.

Example 11

A solution of 124 grams (0.46 mole) of hexa-hydrated ferric chloride ($FeCl_3 \cdot 6H_2O$) in 200 milliliters of ethanol was added to a refluxing solution of 114 grams (0.50 mole) of vinyldiphenylphosphine oxide in 200 milliliters of ethanol. The resulting solution was heated on a steam bath until the ethanol was evaporated. Two hundred and fifty (250) milliliters of benzene were then added and distilled off to azeotropically remove any water or alcohol present. A viscous liquid product was obtained which was extracted with 950 milliliters of isopropanol. Ninety six (96) grams of a 1:2 coordination complex of ferric chloride and vinyldiphenylphosphine oxide were recovered. The complex had a melting point of 118–122° C., began to decompose at 195° C., and was characterized by an infrared spectrum of the phosphoryl band of $8.80\mu$.

*Analysis.*—Calculated for $C_{28}H_{26}P_2O_2Cl_3Fe$: C, 54.3%; H, 4.2%; P, 10.0%; Cl, 17.2%. Found: C, 54.2%; H, 4.2%; P, 9.9%; Cl, 17.4%.

Example 12

A solution of 8.3 grams (0.035 mole) of vinylidiphenylphosphine oxide in 30 milliliters of ethanol was mixed with a solution of 4.4 grams (0.011 mole) of nonahydrated ferric nitrate [$Fe(NO_3)_3 \cdot 9H_2O$] in 30 milliliters of ethanol. The alcohol was evaporated from the clear solution under reduced pressure, leaving a red, viscous liquid 1:2 coordination complex of ferric nitrate and vinyldiphenylphosphine oxide. The complex was characterized by an infrared spectrum of the phosphoryl band of $8.87\mu$.

Example 13

A solution of 9.6 grams (0.042 mole) of vinyldiphenylphosphine oxide in 30 milliliters of ethanol was mixed with a solution of 3.4 grams (0.02 mole) of di-hydrated cupric chloride ($CuCl_2 \cdot 2H_2O$) in 30 milliliters of ethanol. The alcohol was evaporated from the clear solution under reduced pressure, leaving a yellow-brown, viscous liquid 1:2 coordination complex of cupric chloride and vinyldiphenylphosphine oxide. The complex was characterized by an infrared spectrum of the phosphoryl band of $8.70\mu$.

Example 14

A solution of 9.6 grams (0.042 mole) of vinyldiphenylphosphine oxide in 100 milliliters of butanol was mixed with a solution of 4.4 grams (0.02 mole) of nickel bromide ($NiBr_2$) in 120 milliliters of butanol. The alcohol was evaporated from the clear solution under reduced pressure, leaving a green, viscous liquid 1:2 coordination complex of nickel bromide and vinyldiphenylphosphine oxide. The complex was characterized by an infrared spectrum of the phosphoryl band of $8.68\mu$.

Example 15

A solution of 9.6 grams (0.042 mole) of vinyldiphenylphosphine oxide in 30 milliliters of ethanol was mixed with a solution of 7.5 grams (0.02 mole) of nona-hydrated aluminum nitrate [$Al(NO_3)_3 \cdot 9H_2O$] in 30 milliliters of ethanol. The alcohol was evaporated from the clear solution under reduced pressure, leaving a clear, viscous liquid 1:2 coordination complex of aluminum nitrate and vinyldiphenylphosphine oxide. The complex decomposed at 110° C., and was characterized by an infrared spectrum of the phosphoryl band of $8.64\mu$.

Example 16

Six (6) grams of a 1:2 coordination complex of zinc chloride and vinyldiphenylphosphine oxide were heated with 0.1 gram of di-tertiary-butyl peroxide at a temperature of 150° C. for six hours. The viscous solution which formed by this procedure was cooled and triturated with 200 milliliters of ethyl ether to remove unreacted monomer. A solid homopolymer of the 1:2 complex precipitated. The polymerized complex weighed 6 grams, had a softening point of 90° C., was stable in air to 260° C., and had a reduced viscosity in ethylene dichloride of 0.02.

Example 17

A solution of 6 grams of a 1:2 coordination complex of zinc chloride and vinyldiphenylphosphine oxide in 25 milliliters of anhydrous tetrahydrofuran was placed in a dry 125-milliliter flask. The flask was purged with nitrogen and 2.2 milliliters of a 1.2 M soluion of n-butylmagnesium chloride in diethyl ether was added in three equal portions over a one-hour period. A solid homopolymer of the 1:2 complex precipitated. The polymerized complex was removed by filtration, washed in 400 milliliters of n-hexane, and dried at a temperature of 50° C. The polymer had a softening point of 145° C., and a reduced viscosity in ethylene dichloride of 0.03.

Example 18

To a nitrogen-purge Pyrex polymerization tube were charged 8.0 grams of styrene, 0.1 gram of 2,2'-azo-bis(2-methylpropionitrile), and a solution of 2.5 grams of a 1:1 coordination complex of mercuric chloride and vinyldiphenylphosphine oxide in 10 milliliters of ethanol. After purging the tube with nitrogen, the tube was sealed and rotated in a water bath maintained at a temperature of 50° C. for 20 hours. At the end of this time, the tube was opened and 20 milliliters of ethanol were added to the contents thereof. The copolymer which precipitated was washed with ethanol, collected by filtration, and dried in a vacuum desiccator. About 2.9 grams of a copolymer of styrene and the 1:1 complex were recovered. This represented a conversion of about 25 percent. The copolymer had a reduced viscosity of 0.3 in ethylene dichloride. A combined complex content of 9.9 percent by weight was present in the copolymer, as indicated by a chloride analysis of 1.4 percent by weight.

Example 19

To a nitrogen-purged Pyrex polymerization tube were charged 8.0 grams of acrylonitrile, 0.15 gram of 2,2'-azo-bis-(2-methylpropionitrile), and a solution of 2.0 grams of a 1:2 coordination complex of zinc acetate and vinyldiphenylphosphine oxide in 10 milliliters of ethanol. After purging the tube with nitrogen, the tube was sealed and rotated in a water bath maintained at a temperature of 50° C. for 24 hours. At the end of this time, the tube was opened and isopropanol was added to the contents thereof. The copolymer which precipitated was washed with isopropanol, collected by filtration, and dried in a vacuum desiccator. About 6.5 grams of a copolymer of acrylonitrile and the 1:2 complex were recovered. This represented a conversion of about 65 percent. The copolymer had a reduced viscosity of 0.7 in dimethylformamide. A combined complex content of 14.4 percent by weight was present in the copolymer, as indicated by a phosphorus analysis of 0.66 percent by weight.

Example 20

To a nitrogen-purged Pyrex polymerization tube were charged 8.0 grams of acrylonitrile, 0.15 gram of 2,2'-azo-bis-(2-methylpropionitrile), and a solution of 2.0 grams of a 1:2 coordination complex of magnesium chloride and vinylidiphenylphosphine oxide in 10 milliliters of ethanol. After purging the tube with nitrogen, the tube was sealed and rotated in a water bath maintained at a temperature of 50° C. for 24 hours. At the end of this time, the tube was opened and isopropanol was added to the contents thereof. The copolymer which precipitated was washed with isopropanol, collected by filtration, and dried in a vacuum desiccator. About 6.8 grams of a copolymer of acrylonitrile and the 1:2 complex were recovered. This represented a conversion of about 68 percent. The copolymer had a reduced viscosity of 0.5 in dimethylformamide. A combined complex content of 17.6 percent by weight was present in the copolymer, as indicated by a chloride analysis of 2.2 percent by weight and a nitrogen analysis of 21.75 percent by weight.

Example 21

To a nitrogen-purged Pyrex polymerization tube were charged 8.0 grams of styrene, 0.15 gram of 2,2'-azo-bis-(2-methylpropionitrile), and a solution of 2.0 grams of a 1:2 coordination complex of magnesium chloride and vinyldiphenylphosphine oxide in 10 milliliters of ethanol. After purging the tube with nitrogen, the tube was sealed and rotated in a water bath maintained at a temperature of 50° C. for 24 hours. At the end of this time, the tube was opened and isopropanol was added to the contents thereof. The copolymer which precipitated was washed with isopropanol, collected by filtration, and dried in a vacuum desiccator. About 2 grams of a copolymer of styrene and the 1:2 complex were recovered. This represented a conversion of about 20 percent. The copolymer had a reduced viscosity of 0.2 in ethylene dichloride. A combined complex content of 14.2 percent by weight was present in the copolymer, as indicated by a chloride analysis of 1.1 percent by weight.

Example 22

To a nitrogen-purged Pyrex polymerization tube were charged 8.0 milliliters of acrylonitrile, 0.2 gram of 2,2'-azo-bis(2-methylpropionitrile), and a solution of 2.0 grams of a 1:2 coordination complex of titanium tetrachloride and vinyldiphenylphosphine oxide in 20 milliliters of dimethylformamide. After purging the tube with nitrogen, the tube was sealed and rotated in a water bath maintained at a temperature of 50° C. for 24 hours. At the end of this time, the tube was opened and methanol was added to the contents thereof. The copolymer which precipitated was washed with methanol, collected by filtration, and dried in a vacuum desiccator. About 3.4 grams of a copolymer of acrylonitrile and the 1:2 complex were recovered. This represented a conversion of about 34 percent. The copolymer had a reduced viscosity of 0.5 in dimethylformamide. A combined complex content of 6.2 percent by weight was present in the copolymer, as indicated by a phosphorus analysis of 0.59 percent by weight.

Example 23

To a nitrogen-purged Pyrex polymerization tube were charged 8.0 milliliters of acrylonitrile, 0.15 gram of 2,2'-azo-bis(2-methylpropionitrile), and a soluion of 2.0 grams of a 1:2 coordination complex of zinc nitrate and vinyldiphenylphosphine oxide in 10 milliliters of ethanol. After purging the tube with nitrogen, the tube was sealed and rotated in a water bath maintained at a temperature of 50° C. for 20 hours. At the end of this time, the tube was opened and isopropanol was added to the contents thereof. The copolymer which precipitated was washed with isopropanol, collected by filtration, and dried in a vacuum desiccator. About 5.8 grams of a copolymer of acrylonitrile and the 1:2 complex were recovered. This represented a conversion of about 58 percent. The copolymer had a reduced viscosity of 0.6 in dimethylformamide, and could not be made to burn. A combined complex content of 15.8 percent by weight was present in the copolymer, as indicated by a phosphorus analysis of 1.14 percent by weight.

Example 24

To a nitrogen-purged Pyrex polymerization tube were charged 8.0 grams of styrene, 0.15 gram of 2,2'-azo-bis(2-methylpropionitrile), and a solution of 2.0 grams of a 1:2 coordination complex of zinc nitrate and vinylidiphenylphosphine oxide in 10 milliliters of ethanol. After purging the tube with nitrogen, the tube was sealed and rotated in a water bath maintained at a temperature of 50° C. for 20 hours. At the end of this time, the tube was opened and isopropanol was added to the contents thereof. The copolymer which precipitated was washed with isopropanol, collected by filtration, and dried in a vacuum desiccator. About 2.5 grams of a copolymer of styrene and the 1:2 complex were recovered. This represented a conversion of about 20 percent. The copolymer had a reduced viscosity of 0.2 in ethylene dichloride, and could not be made to burn. A combined complex content of 16.3 percent by weight was present in the copolymer, as indicated by a nitrogen analysis of 0.85 percent by weight.

Example 25

To a nitrogen-purged Pyrex polymerization tube were charged 6.0 milliliters of ethyl acrylate, 0.2 gram of 2,2'-azo-bis(2-methylpropionitrile), and a solution of 4.0 grams of a 1:2 coordination complex of stannic chloride and vinyldiphenylphosphine oxide in 20 milliliters of ethanol. After purging the tube with nitrogen, the tube was sealed and rotated in a water bath maintained at a temperature of 50° C. for 24 hours. At the end of this time, the tube was opened and isopropyl ether was added to the contents thereof. The copolymer which precipitated was washed with isopropyl ether, collected by filtration, and dried in a vacuum desiccator. About 3.5 grams of a copolymer of ethyl acrylate and the 1:2 complex were recovered. This represented a conversion of about 35 percent. The copolymer had a reduced viscosity of 0.1 in dimethylformamide, and could not be made to burn. A combined complex content of 36.7 percent by weight was present in the copolymer, as indicated by a phosphorus analysis of 3.14 percent by weight.

Example 26

To a nitrogen-purged Pyrex polymerization tube were charged 10.0 milliliters of styrene, 0.2 gram of 2,2'-azo-bis(2-methylpropionitrile), and 5.0 grams of a 1:2 coordination complex of antimony trichloride and vinyldiphenylphosphine oxide. After purging the tube with nitrogen, the tube was sealed and rotated in a water bath maintained at a temperature of 50° C. for 24 hours. At the end of this time, the tube was opened and the contents thereof were dissolved in 20 milliliters of ethylene dichloride. Methanol was then added and the copolymer which precipitated was washed with methanol, collected by filtration, and dried in a vacuum desiccator. About 7 grams of a copolymer of styrene and the 1:2 complex were recovered. This represented a conversion of about 48 percent. The copolymer had a reduced viscosity of 0.5 in ethylene dichloride. A combined complex content of 27.7 percent by weight was present in the copolymer, as indicated by a phosphorus analysis of 2.51 percent by weight.

The copolymer was easily molded to a transparent plaque.

Example 27

To a nitrogen-purged Pyrex polymerization tube were charged 8.0 grams of acrylonitrile, 0.3 gram of 2,2'-azo-bis(2-methylpropionitrile), and a solution of 2.0 grams of a 1:2 coordination complex of antimony trichloride and vinyldiphenylphosphine oxide in 10 milliliters of tetrahydrofuran. After purging the tube with nitrogen, the tube was sealed and rotated in a water bath maintained at a temperature of 50° C. for 48 hours. At the end of this time, the tube was opened and isopropanol was added to the contents thereof. The copolymer which precipitated was washed with isopropanol, collected by filtration, and dried in a vacuum desiccator. About 7 grams of a copolymer of acrylonitrile and the 1:2 complex were recovered. This represented a conversion of about 70 percent. The copolymer had a reduced viscosity of 0.3 in dimethylformamide, and could not be made to burn. A combined complex content of 19.8 percent by weight was present in the copolymer, as indicated by a nitrogen analysis of 19.75 percent by weight.

Example 28

To a nitrogen-urged Pyrex polymerization tube were charged 11.0 grams of styrene, 0.4 gram of 2,2'-bis(2-methylpropionitrile), and a solution of 3.0 grams of a 1:2 coordination complex of zinc chloride and vinyldiphenylphosphine oxide in 15 milliliters of acetonitrile. After purging the tube with nitrogen, the tube was sealed and rotated in a water bath maintained at a temperature of 50° C. for 20 hours. At the end of this time, the tube was opened and the contents were dissolved in 30 milliliters of tetrahydrofuran. Methanol was then added and the copolymer which precipitated was washed with methanol, collected by filtration, and dried in a vacuum desiccator. About 10 grams of a copolymer of styrene and the 1:2 complex were recovered. This represented a conversion of about 79 percent. The copolymer had a reduced viscosity of 0.2 in ethylene dichloride. A combined complex content of 14.2 percent by weight was present in the copolymer, as indicated by a phosphorus analysis of 1.48 percent by weight.

The copolymer was easily molded into a transparent plaque which could not be made to burn.

What is claimed is:

1. A coordination complex represented by the formula

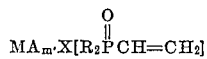

wherein M is a metal selected from the group consisting of the metals present in Groups I–B, II–B, III–A, III–B, IV–A, IV–B, V–A, V–B, VI–B, VII–B, and VIII of the Periodic Table, and those metals of Group II–A of the Periodic Table having an atomic weight below 25; A is a member selected from the group consisting of acetate and monovalent inorganic anions; R is a monovalent hydrocarbon radical having from 1 to 20 carbon atoms; $m$ is an integer having a value equal to the valence of metal M; and X is an integer having a value equal to the coordination number of metal salt $MA_m$.

2. A coordination complex represented by the formula

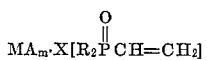

wherein M is a metal selected from the group consisting of the metals present in Groups I–B, II–B, III–A, III–B, IV–A, IV–B, V–A, V–B, VI–B, VII–B, and VIII of the Periodic Table, and those metals of Group II–A of the Periodic Table having an atomic weight below 25; A is a member selected from the group consisting of acetate and monovalent inorganic anions; R is a monovalent hydrocarbon radical having from 1 to 10 carbon atoms; $m$ is an integer having a value equal to the valence of metal M; and X is an integer having a value equal to the coordination number of metal salt $MA_m$.

3. A coordination complex represented by the formula

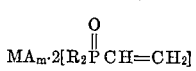

wherein M is a metal selected from the group consisting of the metals present in Groups I–B, III–A, III–B, IV–A, IV–B, V–A, V–B, VI–B, VII–B, and VIII of the Periodic Table, and those metals of Group II–A of the Periodic Table having an atomic weight below 25; A is a member selected from the group consisting of acetate and monovalent inorganic anions; R is a monovalent hydrocarbon radical having from 1 to 20 carbon atoms; and $m$ is an integer having a value equal to the valence of metal M.

4. A coordination complex represented by the formula

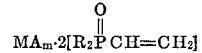

wherein M is a metal selected from the group consisting of the metals present in Groups I–B, III–A, III–B, IV–A, IV–B, V–A, V–B, VI–B, VII–B, and VIII of the Periodic Table; and those metals of Group II–A of the Periodic Table having an atomic weight below 25; A is a member selected from the group consisting of acetate and monovalent inorganic anions; R is a monovalent hydrocarbon radical having from 1 to 10 carbon atoms; and $m$ is an integer having a value equal to the valence of metal M.

5. A 1:2 coordination complex of zinc chloride and vinyldi-n-butylphosphine oxide.

6. A 1:2 coordination complex of zinc chloride and vinyldiphenylphosphine oxide.

7. A 1:2 coordination complex of zinc nitrate and vinyldiphenylphosphine oxide.

8. A 1:2 coordination complex of zinc acetate and vinyldiphenylphosphine oxide.

9. A 1:3 coordination complex of zinc acetate and vinyldiphenylphosphine oxide.

10. A 1:2 coordination complex of magnesium chloride and vinyldiphenylphosphine oxide.

11. A 1:1 coordination complex of mercuric chloride and vinyldiphenylphosphine oxide.

12. A 1:2 coordination complex of aluminum chloride and vinyldiphenylphosphine oxide.

13. A 1:2 coordination complex of antimony trichloride and vinyldiphenylphosphine oxide.

14. A 1:2 coordination complex of stannic chloride and vinyldiphenylphosphine oxide.

15. A 1:2 coordination complex of titanium tetrachloride and vinyldiphenylphosphine oxide.

16. A 1:2 coordination complex of ferric chloride and vinyldiphenylphosphine oxide.

17. A 1:2 coordination complex of ferric nitrate and vinyldiphenylphosphine oxide.

18. A 1:2 coordination complex of cupric chloride and vinyldiphenylphosphine oxide.

19. A 1:2 coordination complex of nickel bromide and vinyldiphenylphosphine oxide.

20. A 1:2 coordination complex of aluminum nitrate and vinyldiphenylphosphine oxide.

21. A process which comprises reacting a metal salt represented by the formula

wherein M is a metal selected from the group consisting of the metals present in Groups I–B, II–B, III–A, III–B, IV–A, IV–B, V–A, V–B, VI–B, VII–B, and VIII of the Periodic Table, and those metals of Group II–A of the Periodic Table having an atomic weight below 25; A is a member selected from the group consisting of acetate and monovalent inorganic anions; and $m$ is an integer having a value equal to the valence of metal M; with a vinylphosphine oxide represented by the formula

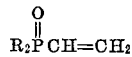

wherein R is a monovalent hydrocarbon radical having from 1 to 20 carbon atoms.

22. A process as in claim 21 wherein reaction is effected in an inert liquid organic solvent.

23. A process which comprises polymerizing a coordination complex represented by the formula

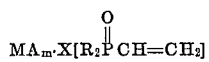

wherein M is a metal selected from the group consisting of the metals present in Groups II-B, III-A, III-B, IV-A, IV-B, V-A, V-B, VI-B, and VII-B of the Periodic Table, and those metals of Group II-A of the Periodic Table having an atomic weight below 25; A is a member selected from the group consisting of acetate and monovalent anions; R is a monovalent hydrocarbon radical having from 1 to 20 carbon atoms; $m$ is an integer having a value equal to the valence of metal M; and X is an integer having a value equal to the coordination number of metal salt $MA_m$.

References Cited

UNITED STATES PATENTS

| 3,035,096 | 5/1962 | Cooper | 260—606.5 |
| 2,784,206 | 3/1957 | Chadwick et al. | 260—429 |
| 3,228,924 | 1/1966 | Childers | 260—429 |

FOREIGN PATENTS 865,331   4/1961   Great Britain.

JOSEPH L. SCHOFER, *Primary Examiner.*

J. KIGHT, *Assistant Examiner.*

U.S. Cl. X.R.

260—80.3, 80.71, 78.5, 82.1, 85.5, 85.7, 86.1, 87.5, 88.1, 429, 439, 606.5